Figure 1:
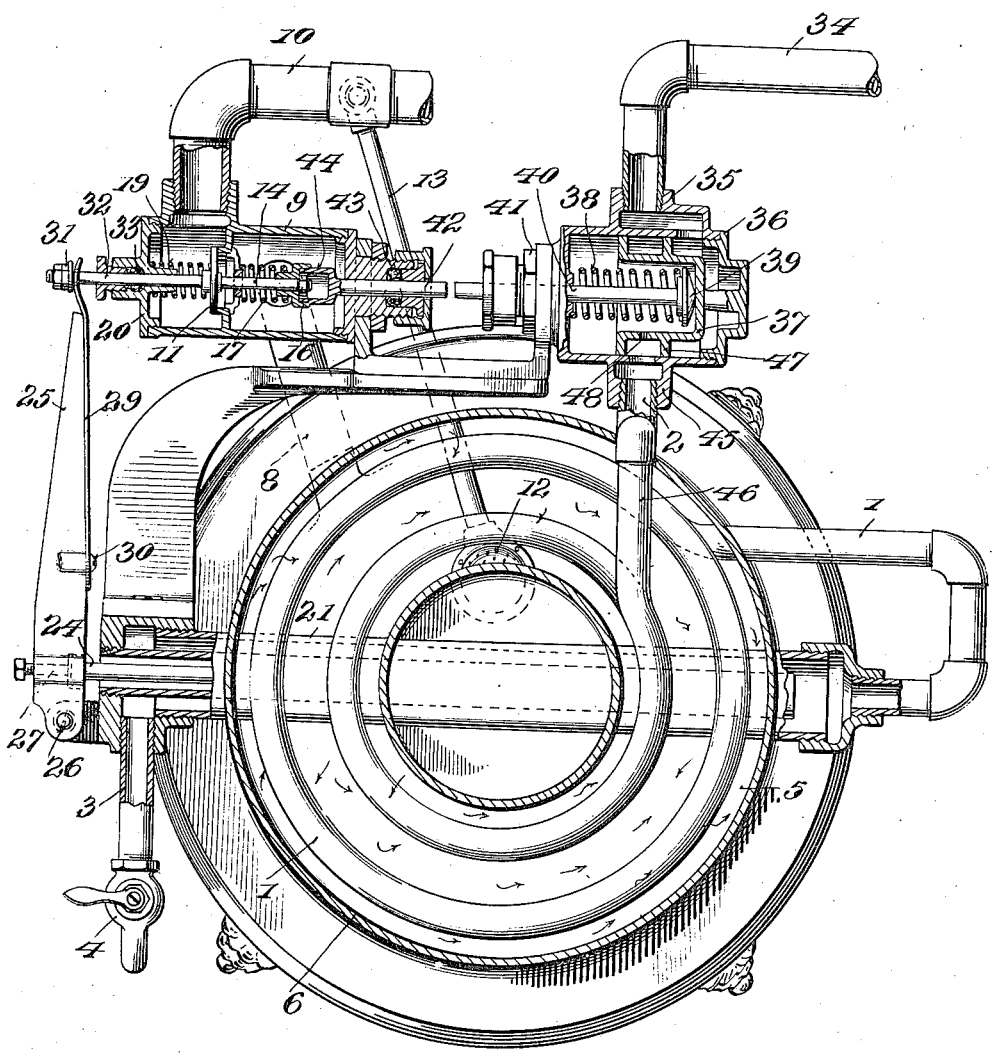

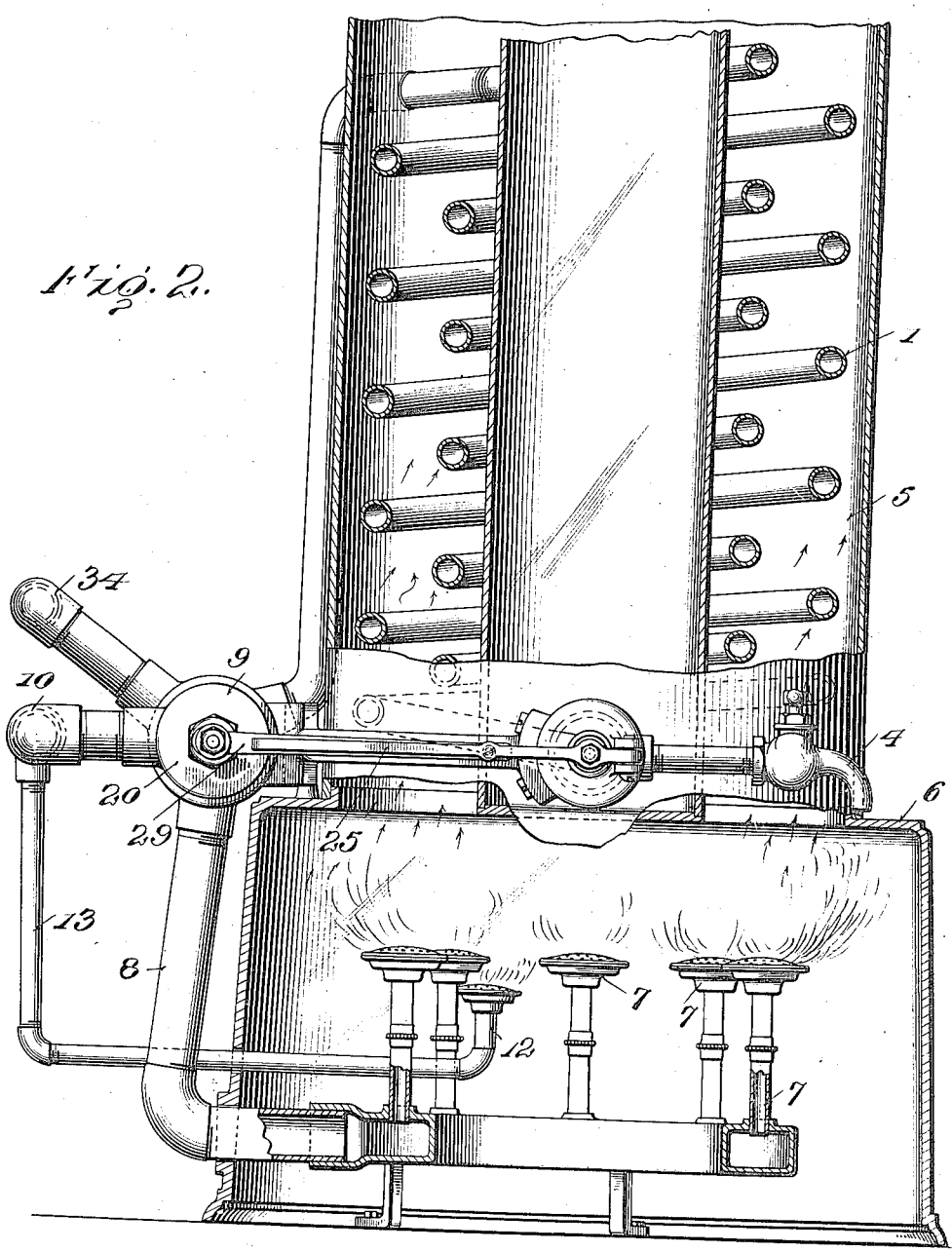

E. RUUD.
WATER HEATER.
APPLICATION FILED JULY 8, 1909.
1,028,284.
Patented June 4, 1912.
4 SHEETS—SHEET 3.
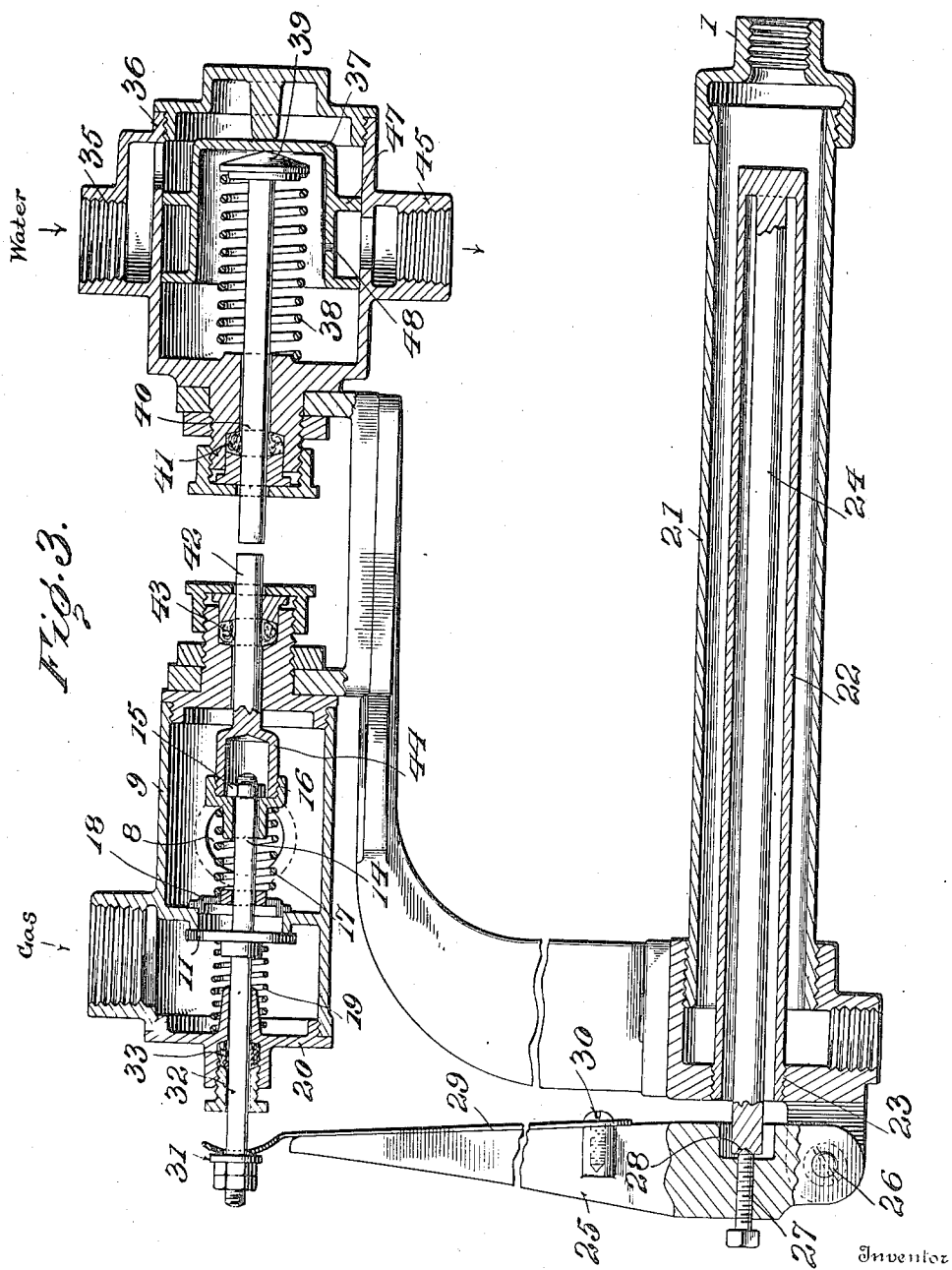

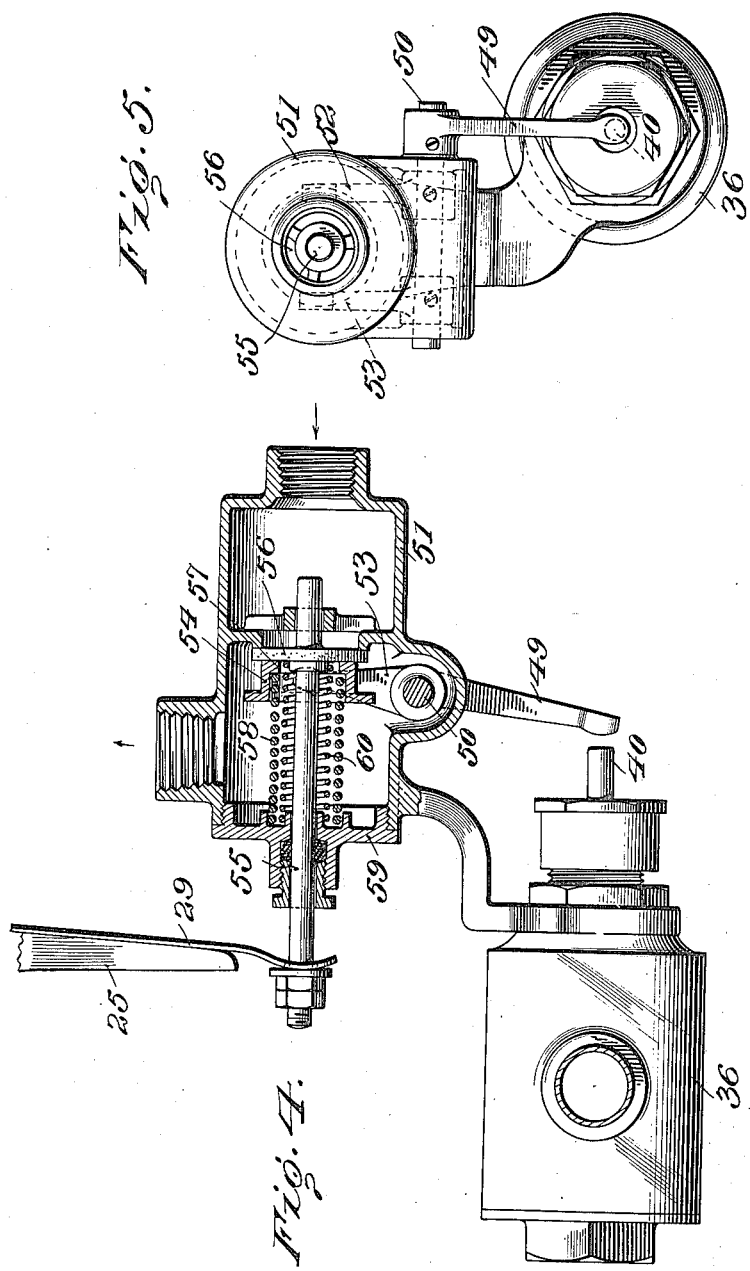

UNITED STATES PATENT OFFICE.

EDWIN RUUD, OF PITTSBURGH, PENNSYLVANIA.

WATER-HEATER.

1,028,284.     Specification of Letters Patent.     Patented June 4, 1912.

Application filed July 8, 1909. Serial No. 506,577.

*To all whom it may concern:*

Be it known that I, EDWIN RUUD, of Pittsburgh, Pennsylvania, have invented a new and useful Improvement in Water-Heaters, which invention is fully set forth in the following specification.

This invention relates more particularly to automatic water heaters designed to heat water to be used as hot water for domestic or other purposes, or to heat water to convert the same into steam for power, heating or other purposes. In U. S. Patent No. 903,007, granted to me November 3d, 1908, I have disclosed a water heater of this general type, having a water receptacle in the form of a heating coil, a burner for heating the same, and a fuel supply leading to the burner, with a plurality of means for controlling the fuel supply, one of which is controlled by the flow of water through the receptacle, and the other of which is operated by variations of temperature in the water receptacle. The object of the structure set forth in my said patent is to avoid a waste of gas during periods in which it is not desired to heat the water, as well as liability to damage to the heating apparatus by the application of heat in the absence of a proper supply of water, or by excessive application of heat when the water is not drawn from the heater, this latter undesirable condition being liable to arise by reason of the sticking of the water valve mechanism and the consequent failure of the latter to actuate the fuel valve controlled thereby to shut off the supply of fuel when the flow of water ceases. In the construction of my said patent, the thermostatically controlled valve coöperates with the water-controlled valve, and acts to shut off the supply of fuel whenever the temperature in the heater rises above a predetermined degree.

The object of the present invention is to accomplish the above-indicated results by the use of a single valve for controlling the fuel supply, which valve shall be open during the time that water is being drawn from the receptacle, so long as the temperature of the water does not exceed a predetermined degree, but which shall be closed when the temperature of the water reaches said predetermined degree, regardless of whether water is being drawn from the heater or not. By this means the construction of the valve mechanism for controlling the flow of fuel is greatly simplified and cheapened, without decreasing the efficiency of the device as a whole.

With these objects in view, the invention, generally stated, consists of a water receptacle, such as a heating coil, provided with a suitable inlet, such as a branch from a water main under pressure, and a suitable outlet, such as a conduit leading to an ordinary spigot, the water in the coil being heated by any suitable burner having the usual pilot-light or any other suitable igniting device. A fuel supply conduit leads to said burner, and is provided with a valve controlling the flow of a fuel, such as gas, through the conduit, which valve is normally held seated by a suitable power mechanism, as for example, spring tension. Preferably two springs are employed, one a strong and the other a weaker spring, both of them exerting their tension in a direction to close the fuel valve. Acting in opposition to said power mechanism are suitable means actuated by variations of temperature in the water receptacle or heating coil, which temperature-actuated means tend to open the fuel valve whenever the temperature of the water in the heating coil is below the predetermined temperature, but is not sufficient, even when the water in the coil is cold, to overcome the power mechanism (such as the two springs), which act to hold the valve closed.

Interposed in the water supply conduit, and preferably at or near where said conduit connects with the heating coil, there is a water motor, as for example, a piston which, when water is being withdrawn from the heater, is shifted by the flow of the water through the conduit, and acts in opposition to the means holding said valve closed. For example, said water motor acts to relieve the fuel valve of the tension of the stronger one of the two springs, when such are employed to hold the valve closed, and thereupon the temperature-actuated means acts to open the valve in the fuel supply conduit, and permit the flow of fuel to the burner. If, during the time that water is being drawn from the burner, the temperature of the water exceeds the predetermined degree, the temperature-actuated means automatically decreases the power with which it acts to open the valve, and thereupon that increment of the valve-closing means which is not overcome by the water-actuated motor acts to close the valve, thus preventing the heating of the water in the coil above the desired temperature. Should the water-actuated motor stick or fail to return to its normal position when the flow of water through the heater ceases, the same action as that last above described will result. That is, the rise in temperature of the water in the heater will cause the temperature-actuated means to decrease or wholly eliminate the power with which it acts to open the fuel valve, thus permitting the increment of power not opposed by the water motor to close the valve, which will then remain closed as long as the temperature of the water in the heating coil is above the predetermined degree.

The means actuated by variations in temperature for opening the fuel valve or decreasing the application of opening power thereon, as the case may be, are preferably in the form of a suitable thermostat which, when the temperature of the water is below the predetermined degree, acts on the valve in a direction to open it, but which, when the temperature of the water reaches or exceeds the predetermined degree, has its power (which is directed to open the valve) removed therefrom, thus permitting the smaller increment of the closing force which is not overcome by the water motor to close the fuel valve.

The inventive idea involved is capable of receiving a variety of mechanical expressions, one of which, for the purpose of illustrating the invention, is shown in the accompanying drawings, but it is to be expressly understood that said drawings are designed for purposes of illustration only, and are not to be taken as defining the limits of the invention, reference being had to the claims for that purpose.

In said drawings—Figure 1 is a horizontal sectional plan of a heater and valve mechanism embodying my invention; Fig. 2 is a vertical section through the heater, parts thereof, however, being shown in elevation; Fig. 3 is an enlarged horizontal section through the valve mechanism, the water motor and the thermostatic device; Fig. 4 is a horizontal plan, partly in section, of another mechanical expression of the same inventive idea; and Fig. 5 is an end elevation of Fig. 4 looking from the right of said figure.

Referring to the drawings, in which like numerals indicate like parts throughout the several views, 1 is the water receptacle, here shown in the form of a coil of pipe, the inlet end 2 of which is connected with a valve casing, hereinafter to be described, and the outlet end of which is connected to a pipe 3 leading to a spigot 4, which latter is located at the point where water is to be drawn. The receptacle or coil 1 is located in a suitable flue 5 carried by a base 6, and heated by burners 7 of any suitable construction, which burners are supplied with fuel through a branch pipe 8 leading from a valve casing 9, which casing is also connected with the main fuel supply conduit 10, and has therein a fuel supply valve 11, which controls the supply of fuel from the main 10 to the burners 7. A pilot-light 12 is supplied by branch pipe 13 with fuel from the main 10, said branch-pipe 13 leading around the valve casing 9. It will be understood that this pilot-light, as is usual in constructions of this kind, is kept constantly burning.

Referring to Figs. 1 and 3, the valve 11 is provided with a stem, the part 14 of which projects from one side of the valve, and has on the end thereof a suitable shoulder, as for example, the nut 15. Surrounding part 14 of the valve stem is a loosely fitting sleeve 16, which is free to slide on the stem 14, said sleeve forming an abutment for a strong spring 17, which reacts between the sleeve 16 and a spider 18 spanning the valve opening. The tension of the spring 17 thus acts to draw the valve 11 firmly to its seat. In addition to the spring 17, there is provided a lighter spring 19, reacting between the back of the valve 11 and the interior face of the end 20 of the valve casing, the tension of this spring also acting in a direction to close the valve 11. In circuit with the coil, and preferably forming a part thereof, is an enlarged pipe 21, within which is located a thermostat, one member 22 of which has one end firmly mounted in a framework 23, the other end being free so that the member may expand or contract in response to the variations of temperature in the water flowing through the enlarged pipe 21, which water surrounds the member 22. The other member 24 of the thermostat has its inner end secured to the interior of the free end of the member 22, and its other end projects outward and bears against a lever 25 suitably pivoted at 26 to the framework of the structure. Preferably the bearing of the member 24 upon the lever 25 is through the medium of a pointed screw 27 passing through the lever and having its pointed end resting in a suitable cavity 28 formed in the member 24. By means of this screw, the thermostat may be adjusted so as to operate, as hereinafter described, at the desired temperature.

Mounted upon the lever 25 is a spring blade or arm 29, secured to lever 25 at one end, as by a screw 30, with its other end engaging a shoulder, here shown in the form of a nut 31 on the end of the valve stem 32, which projects outward through the end 20 of the valve casing, and preferably is surrounded by a suitable packing 33. The parts are so proportioned and adjusted that whenever the water in the conduit or coil of the heater is below the desired or predetermined temperature, spring blade 29 is pressed against the shoulder 31 from right to left, as shown in Fig. 3, with power sufficient to overcome the spring 19, but not sufficient to overcome the combined springs 14 and 19, and the result is that when both of said springs are acting in the valve, said valve remains closed, notwithstanding the tendency of the thermostat, acting through the spring blade 29, to open said valve. But when the water is heated to the predetermined temperature, the tension of the thermostatic spring blade 29 is wholly withdrawn from the valve, and the latter is then closed by the spring 19.

A conduit 34 connected to a suitable source of water under pressure, is connected at 35 to a piston cylinder or casing 36, within which is located a piston 37 held in its normal position, shown in Figs. 1 and 3, by a spring 38 reacting between the left-hand end of the cylinder and the head 39 of a piston stem 40, which projects out through the left-hand end of the piston cylinder or casing through a suitable stuffing-box 41 in alinement with a rod 42, which passes into the end of the valve casing 9 through a stuffing box 43, and is connected to the sleeve 16 by means of the hollow cylindrical connection 44, which cylinder is of sufficient depth to permit the end of the valve stem 14 to have a limited amount of play therein. The piston cylinder or casing 36 is also connected at 45 to the inlet end 2 of the heating coil 1. The piston 37 not only acts as a motor piston, but also as a valve controlling the flow of water from the inlet 35 of the piston cylinder to the outlet 45 thereof, this being accomplished by an annular flange 47 carried on and forming a part of the piston and interposed between the ports 35 and 45. As here shown, the piston 37 is hollow, and ingress and egress of water within the hollow piston is permitted by reason of the port 48 formed on the heater side of the flange valve 47.

During the period when no water is being drawn from the heater, the parts occupy the position shown in Figs. 1 and 3, the piston 37 holding the valve 47 in a position to cut off the flow of water from the main 34 to the coil 1. When, however, water is withdrawn from the coil, as through the spigot 4, the pressure of the water in the supply conduit 34 shifts the piston 37, and with it the valve 47, to the left, as shown in Figs. 1 and 3, thus permitting a free flow of water through the piston cylinder 36 and through the heating coil. This shifting of the piston from right to left causes the piston rod 40 to contact with the rod 42, and force it to the left against the tension of the spring 17, thereby relieving the valve 11 of the tension of said spring 17, whereupon the spring blade 29, which is held under tension by the thermostat, shifts the valve from right to left against the tension of the lighter spring 19, and thus opens the valve and permits the flow of fuel to the burner. The flow of water through the heating coil being stopped, as by closing the spigot, and the water pressure on the opposite sides of the piston 37 becoming balanced, the piston is returned to the position shown in Figs. 1 and 3 by the spring 38, and at the initiation of its return movement, also by the tension of the spring 17. The sleeve 16 being relieved of the pressure due to the piston, is then shifted from left to right, and contacting with the nut 15 on the stem 14, acts to add the tension of the spring 17 to that of the spring 19, and thereby overcome the tension of the thermostatic blade spring 29 and close the valve 11. If, when the flow of water through the heating coil is stopped, the piston valve 37—47 should fail to respond to the action of the piston spring 38 and return to its normal position, the flow of fuel to the burners would continue, since the valve 11 would be held open, and there would be danger that the water in the coils (which are necessarily very thin in order to permit quick heating) would be heated above the desired temperature and exert an internal pressure on the coil, liable to burst the same, unless means were provided for shutting off the flow of fuel to the burner. When, however, the temperature of the water in the heating coil rises above a predetermined degree, the thermostat acts to relieve the pressure on the lever 25, and hence withdraw the opening pressure which the same exerts through the spring blade 29 on the valve stem 32, thus leaving the light spring 19 free to close the valve.

Referring to Figs. 4 and 5, wherein there is illustrated another mechanical expression of the same inventive idea, the piston cylinder 36, together with the inlets and outlets and the combined valve and piston therein, are the same as shown in Figs. 1 and 3. The piston stem 40 projects from the end of the piston casing in close juxtaposition to a lever arm 49 keyed to a shaft 50 passing through valve casing 51, which shaft 50 has keyed to it, within the valve casing 51, two arms 52 and 53, which engage trunnions on opposite sides of a sleeve 54 surrounding the valve stem 55 of the fuel valve 56. Formed on the interior of the sleeve 54 is an annular shoulder 57, which forms a seat for the strong spring 58 reacting between said seat and the end 59 of the valve casing. Also surrounding the valve stem 55, and within the spring 58, is the light spring 60, reacting between the valve 56 and the end 59 of the valve casing. The valve stem 55 projects out through the end 59 of the casing, and is engaged by the spring blade 29 of the thermostatic lever 25, as in the construction shown in Figs. 1 and 3, the said spring blade 29 tending to open the valve 20 with power sufficient to overcome the light spring 60, but yielding to the combined tension of the springs 58 and 60.

When water is being drawn through the heating coil, the piston rod 40 moves from left to right in Fig. 4, thereby actuating the lever arm 49, and through it the sleeve 54, so as to relieve the valve 56 of the tension of the strong spring 58, whereupon the tension of the thermostatic spring blade 29 overcomes the tension of the spring 60 and opens the valve 56. The operation of the parts in other respects is identical with that described in connection with Figs. 1 and 3.

It will be seen from the foregoing that I have provided a water heater wherein a single valve controls the flow of fuel to the burner, with power mechanism normally holding said valve closed, which power mechanism, when it is desired to open the valve, is overcome partly by devices operated by the flow of water through the heater, and partly by the thermostatic apparatus. Furthermore, it will be perceived that in case the devices operated by the flow of water through the heater should stick or fail to operate to permit that portion of the power mechanism controlled by it to act on the valve when the flow of water through the heater is discontinued, the thermostatic apparatus will permit that portion of the power mechanism under its control to act upon the valve to close the same when the temperature of the water in the heater reaches a predetermined degree. By adjusting the thermostatic apparatus so that it will release the fuel valve before the temperature of the water in the heater reaches a degree where the internal pressure will be liable to damage the heater, all danger arising from the possible sticking of the devices operated by the flow of the water through the heater is effectually obviated, and this is accomplished by a simplified apparatus, little liable to get out of order, and cheaply constructed.

What I claim is:—

1. In a water heater, the combination of a conduit for water under pressure, a burner for heating the water in said conduit, a valve controlling the flow of fuel to said burner, power mechanism in the form of two springs normally holding said valve closed, a device operated against the tension of one of said springs by the flow of water through said conduit, and a thermostat opening the said valve against the tension of the other of said springs when the temperature of the water is below a predetermined degree.

2. In a water heater, the combination of a water receptacle, a burner, a fuel supply conduit, a valve in said conduit, thermostatic means normally tending to open said valve, a power device closing said valve in opposition to said thermostatic means, and mechanism actuated by the flow of water through said receptacle and in part overcoming said power device, whereby said thermostatic means overcomes the remaining part of said power device and opens said valve.

3. In a water heater, the combination of a water receptacle, a burner, a fuel supply conduit, a valve in said conduit, thermostatic means normally tending to open said valve, a compound power device closing said valve in opposition to said thermostatic means, and mechanism actuated by the flow of water through said receptacle and overcoming one part of said compound power device, whereby said thermostatic means overcomes the remaining part of said power device and opens said valve.

4. In a water heater, the combination of a water receptacle, a burner, a fuel supply conduit, a valve in said conduit, thermostatic means normally tending to open said valve, a plurality of springs acting to close said valve in opposition to said thermostatic means, and mechanism actuated by the flow of water through said receptacle and relieving said valve of the tension of one of said springs, whereby the thermostatic means is enabled to overcome the other spring and open said valve.

5. In a water heater, the combination of a water receptacle having an inlet and an outlet, a burner for heating the same, a fuel supply conduit leading to said burner, a valve controlling said conduit, thermostatic means tending to open said valve when the water in said receptacle is below a predetermined temperature, compound power mechanism overcoming said thermostatic means and normally holding said valve closed, and a motor actuated by the flow of water through said receptacle and overcoming one increment of said compound power mechanism, whereby the remaining increment of said power mechanism is overcome by said thermostatic means and the valve opened thereby.

6. In a water heater, the combination of a water receptacle, a burner for heating the water therein, a valve controlling the flow of fuel to said burner, two springs acting on said valve to hold it closed, means actuated by the flow of water through the heater in opposition to one of said springs, and a thermostatic device opening the said valve against the tension of the other spring.

In testimony whereof I have signed this specification in the presence of two subscribing witnesses.

EDWIN RUUD.

Witnesses:
E. E. BELL,
A. C. WAY.